United States Patent

[11] 3,565,060

| [72] | Inventor | William C. Sipple<br>Lansdale, Pa. |
|---|---|---|
| [21] | Appl. No. | 754,310 |
| [22] | Filed | Aug. 21, 1968 |
| [45] | Patented | Feb. 23, 1971 |
| [73] | Assignee | The United States of America as represented by the Secretary of the Navy |

[54] BIOPOTENTIAL SENSOR EMPLOYING INTEGRATED CIRCUITRY
4 Claims, 4 Drawing Figs.

[52] U.S. Cl. .................................................. 128/2.06
[51] Int. Cl. .................................................. A61b 5/04
[50] Field of Search .................................... 128/2.05, 2.06, 2.1, 2.15, (Digest)

[56] References Cited
UNITED STATES PATENTS
| 3,029,808 | 4/1962 | Kagan | 128/2.06 |
| 3,212,496 | 10/1965 | Prestor | 128/2.06 |
| 3,253,588 | 5/1966 | Vuilleumier et al. | 128/2.15UX |
| 3,320,947 | 5/1967 | Knoll | 128/2.1 |
| 3,380,445 | 4/1968 | Frasier | 128/2.06 |
| 3,405,288 | 10/1968 | Pittrich | 128/2.05 |

Primary Examiner—William E. Kamm
Attorneys—Edgar J. Brower and Henry Hansen

ABSTRACT: An electrocardiograph having pasteless sensor electrodes formed to directly contact the skin and thereby transfer biopotentials while maintaining a very high signal-to-noise ratio. The active electrodes are contiguously affixed to integrated circuit chips of operational amplifiers for maintaining a very low impedance to the measuring and recording instrument.

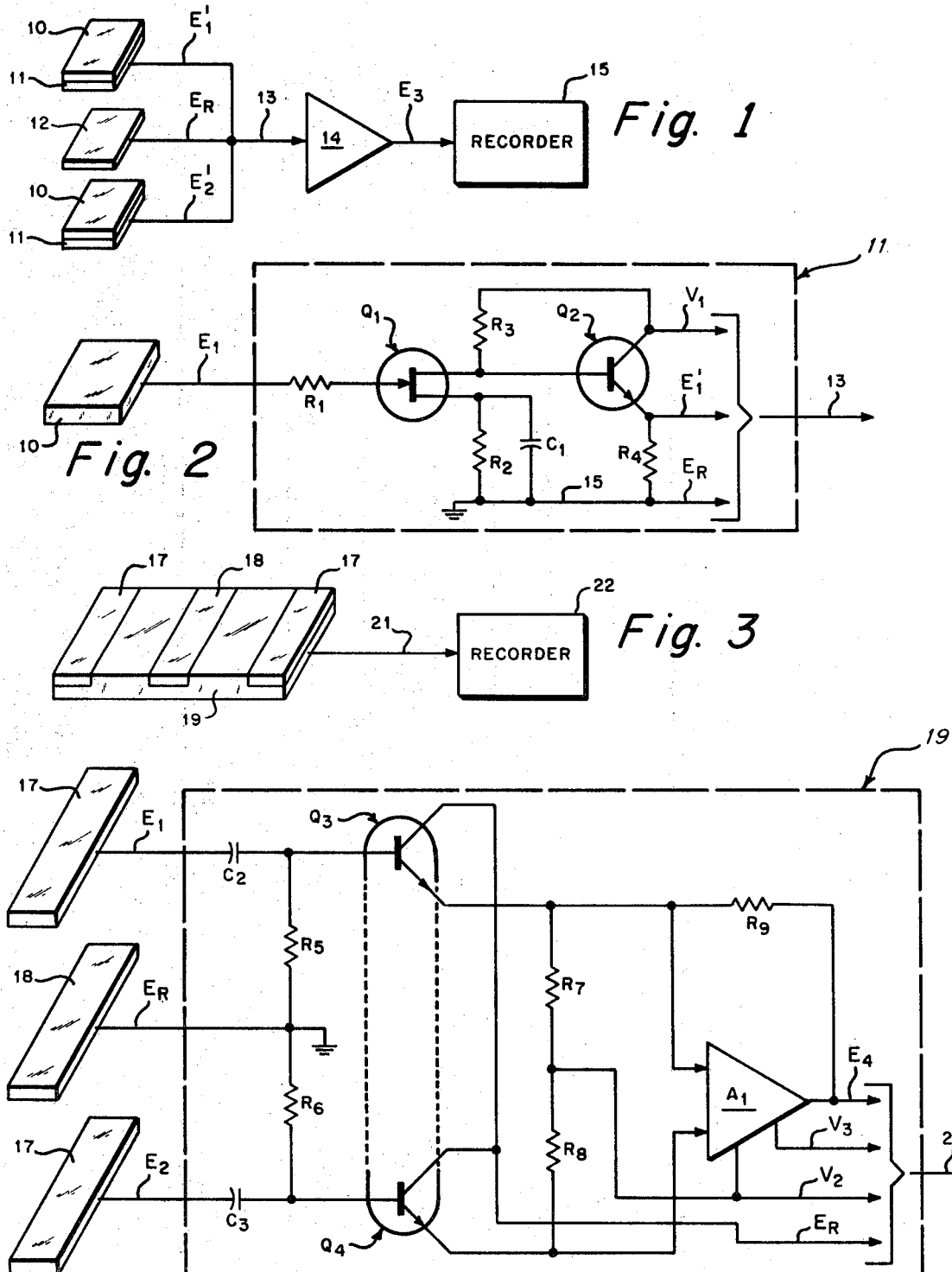

BIOPOTENTIAL SENSOR EMPLOYING INTEGRATED CIRCUITRY

BACKGROUND OF THE INVENTION

The present invention generally relates to electrocardiographic, electroencephalographic, and electromyographic sensors for continuous monitoring; and more particularly relates to an improved sensor for transferring biopotentials from surfaces of human and animal bodies to measuring and recording instruments with a relatively high signal-to-noise ratio.

Electrocardiographs, etc., heretofore required an electrically conductive paste be applied with the electrode to the skin of the subject in order to produce a very low skin-to-electrode or source impedance relative to the input shunt impedance of the measuring instrument. At the same time, however, it is also desirable to maintain the input shunt impedance as low as possible in order to maintain a high signal-to-noise ratio. In a typical EKG application, for example, where standard length electrode conductors are used, the maximum peak-to-peak biopotential is approximately 2 millivolts, and the source impedance of a pasted electrode is about 5,000 ohms, an input shunt impedance of 50,000 ohms is considered the minimum for obtaining an acceptable noise level.

In such applications, the electrode paste which is rubbed into the subject's skin contains an abrasive salt for conductivity. After extended usage, such as in medical monitoring of pilots and astronauts in aerospace flights, the paste causes great irritation and lesions in the skin. Also, the paste eventually dries up raising the source impedance up to 100,000 to 200,000 ohms thereby decreasing the voltage drop across the input shunt impedance of the measuring instrument below a measurable value. In addition, due to the increase in total impedance (source plus shunt), the noise level rises. The total effect results in a considerable drop in signal-to-noise ratio below the capabilities of the measuring instrument.

SUMMARY OF THE INVENTION

Accordingly, it is a general purpose of the present invention to provide improved electrocardiographic, electroencephalographic and electromyographic sensors which permit the transfer of biopotentials from animal bodies without the use of electrode pastes while maintaining a relatively high signal-to-noise ratio.

This is accomplished essentially by affixing the electrodes of the sensor directly to integrated circuit chips of operational amplifiers. Each amplifier has a high input shunt impedance relative to the source (skin-to-electrode) impedance and a relatively low output impedance, realizing thereby a sensor of impedance stepdown and low-noise voltage gain at the signal source. When the biopotentials can be measured over short distances (up to about 3 inches), an alternative embodiment comprises three electrodes directly attached to a single integrated circuit chip of a differential-type operational amplifier.

BRIEF DESCRIPTION OF THE DRAWING

FIG. 1 is an electrical block diagram of one preferred embodiment of the invention;

FIG. 2 is a detail circuit diagram of an integrated circuit chip as applied to the inventive embodiment of FIG. 1;

FIG. 3 is an electrical block diagram of another preferred embodiment of the invention; and FIG. 4 is a detail circuit diagram of an integrated circuit chip as applied to the inventive embodiment of FIG. 3.

DESCRIPTION OF THE PREFERRED EMBODIMENTS

The fundamental inventive concepts are disclosed herein as applied to an electrocardiograph (EKG). It is contemplated, of course, that the inventive concepts apply equally to electroencephalographs (EEG), electromyographs (EMG) and the like, and that variations in structure necessitated by each particular application and which are within the purview of ordinarily skilled artisans are within the scope of the invention.

Referring now to FIG. 1, two active electrode plates 10, which may be constructed as a solid plate or wire mesh screen of highly conductive metal such as silver, are each contiguously bonded on one side to an integrated circuit chip 11 for directly contacting the subject's skin at discrete points. The length and width of each plate 10 and chip 11 are preferably coextensive and do not exceed 1 centimeter. A third common electrode plate 12 when contacting the skin provides a reference potential $E_R$ which is preferably grounded. As applied to EKG's, the active electrodes and chips are placed at the outer end of each arm with the electrodes held in direct contact with the skin by any convenient means such as straps or nonirritating adhesive tape. The skin-to-electrode or source impedance will normally range between 100,000 and 200,000 ohms.

Biopotentials $E_1$ and $E_2$ at either arm are sensed relative to a reference $E_R$ at electrode 12 by active electrodes 10. As shown in FIG. 2, $E_1$ is directly fed to an isolating resistor $R_1$ of the preamplifier chip 11 which limits the current to the gate of a field effect transistor $Q_1$ and prevents the bias from upsetting. The conductor between the electrode 10 and the resistor $R_1$ is preferably maintained as short as possible in order to minimize its susceptibility to noise. A resistor $R_2$, connected between the source terminal and a conductor 15 which, in turn, is connected to grounded reference electrode 12, biases the source input of the transistor $Q_1$. A capacitor $C_1$, connected in parallel with $R_1$, provides a low impedance path to ground and biases the input signal thus developing an amplified replica of the input signal in the drain circuit of the transistor $Q_1$ across a resistor $R_3$. A gain of at least approximately 40 to 1 is contemplated.

The replica signal is then applied to the base of a bipolar transistor $Q_2$ and the replica now appears substantially as $E'_1$ across a resistor $R_4$ which is connected between the emitter and the grounded conductor 15. The transistor $Q_2$ is connected in an emitter-follower configuration in order to reduce the output impedance. A positive voltage $V_1$ provides an operating bias to both transistors $Q_1$ and $Q_2$.

For the specific electrical components disclosed and tabulated hereinafter of an actual sensor constructed according to the invention, the input shunt impedance (measured between active electrode 10 and the grounded conductor 15) is approximately $10^{11}$ ohms, and the output impedance is approximately $10^3$ ohms. Thus, there is a $10^6$ impedance step-up at the chip input and to a $10^8$ impedance stepdown at the chip output of the preamplifier. The Biopotential $E_2$ is similarly transformed to a low impedance output $E'_2$ by another chip 11 identical to the chip in FIG. 2.

The output signals $E'_1$ and $E'_2$ from chips 11 are fed, together with the reference potential $E_R$ from electrode 12, through conductors 13 to a conventional differential-type operational amplifier 14 remote from the sensors where the differential signal is further amplified and the output signal $E_3$ is transmitted to a recorder 15. The length of the conductors 13 from the sensor is not critical since the chip output impedance is very low relative to the input impedance of the amplifier 14, hence not susceptible to noise. An inventive sensor constructed with the specific elements tabulated hereinafter developed a noise level not exceeding 25 to 50 $\mu v$. The recorder 15 may be a strip chart on which output signal, representative of the differential biopotential $E_3$, is graphically indicated, or it may be a transmitter-receiver combination for remotely monitoring the subject, such as would be desired in an aerospace flight studies.

FIG. 3 illustrates another embodiment of the invention in which two active electrodes 17 and a common or reference electrode 18 positioned therebetween are affixed in spaced relation to a single integrated circuit chip 19 which contains differential-type operational amplifier. Sensors of this type may be useful in EEG monitoring where the active electrode spacing may be very small, for example less than 3 inches. The manner of securing the electrodes to the skin may be described above in connection with FIG. 1. The chip output is connected through conductor 21 to a remote recorder 22 which may be either a strip chart type or a transmitter-receiver type like recorder 15 in FIG. 1.

Referring now to FIG. 4, the biopotential outputs $E_1$ and $E_2$ at the two active electrodes 17 are fed to respective isolating capacitors $C_2$ and $C_3$, the other terminals of which are connected to the common grounded electrode 18 through resistors $R_5$ and $R_6$. The junction of $C_2$ and $R_5$ is connected to the base of a transistor $Q_3$. These capacitor-resistor combinations prevent upsetting the bias on the transistor bases; and, additionally, $R_1$ and $R_2$ set the operating potential. The transistors $Q_3$ and $Q_4$ offer a low impedance match with a high impedance input to a differential amplifier $A_1$. Resistors $R_7$ and $R_8$, in combination with $R_5$ and $R_6$ and the emitters of $Q_3$ and $Q_4$, provide the high impedance input. For an EKG sensor having the particular components tabulated hereinbelow, the input impedance is approximately $4 \times 10^6$ ohms. Higher input impedances can be expected by substitution of field effect transistors for transistors $Q_3$ and $Q_4$ in the embodiment of FIG. 1. The output signal $E_4$ of the amplifier 23 is an amplified replica of the difference in biopotentials measured by the electrodes. Resistor $R_9$ connected between one input of the amplifier $A_1$ and its output sets the gain at a desired value. For the specific example, a gain of 200 was selected. The voltages $V_2$ and $V_3$ provide operating biases to the transistors, and negative and positive voltages, as desired, to the amplifier Al. Noise levels not exceeding 5 $\mu$v. have been attained.

Biopotential sensors which have been constructed according to the invention and which have been successfully operated have values or nomenclature as tabulated below. Of course, it is understood that the invention is not limited to these specific values and nomenclature except to the extent they have been positively recited in the appended claims.

TABLE OF VALUES/NOMENCLATURE

| | |
|---|---|
| $R_1$, 470K ohms | $C_1$, 20 $\mu$f. |
| $R_2$, 470K ohms | $C_2$, 1 $\mu$f. |
| $R_3$, 220K ohms | $C_3$, 1 $\mu$f. |
| $R_4$, 82K ohms | $Q_1$, 2N3819. |
| $R_5$, 4.7M ohms | $Q_2$, A153. |
| $R_6$, 4.7M ohms | $Q_3, Q_4$, NS7070. |
| $R_7$, 0.22M ohms | $A_1$, $\mu$A709. |
| $R_8$, 0.22M ohms | $V_1$, +8 volts. |
| $R_9$, 1.00M ohms | $V_2$, −3 volts. |
| | $V_3$, +5.6 volts. |

Some of the many advantages of the invention as described hereinabove should now be apparent. For example, the use of integrated circuit chips of operational amplifiers directly affixed to the electrodes permits high skin-to-electrode impedance to exist without the attendant high noise level. No irritating electrode pastes are necessary to maintain a low impedance contact thus permitting extended periods of monitoring. There are no high impedance circuits with long electrical conductors which would increase the sensor susceptibility to noise. The signal-to-noise ratio has been considerably enhanced thereby lending it particularly suitable for remote medical monitoring such as in aerospace flight tests. The sensors are relatively light and easily attached to the skin permitting maximum mobility of the subject thereby eliminating the objections to heavily shielded electrical conductors. The electrodes are maintained very small in dimension so that they may be easily attached with ordinary adhesive tape or straps.

It will be understood that various changes in the details, materials, steps and arrangements of parts, which have been herein described and illustrated in order to explain the nature of the invention, may be made by those skilled in the art within the principle and scope of the invention as expressed in the appended claims.

I claim:

1. A biopotential sensor comprising:

electrode plates of conductive material each formed on one side to directly contact selected surfaces of the skin of a subject for transferring biopotentials thereat, said electrode plates include two active plates and a reference plate;

integrated circuit means contiguously affixed to the other sides of respective ones of said active plates and including discrete operational amplifier chips receiving said biopotentials at said active plates for producing output signals of opposite phase indicative of said active plate biopotentials for transmission; and remote measuring means connected to said circuit means and said reference plate for receiving and indicating said output signals and reference plate biopotential.

2. A biopotential sensor according to claim 1 wherein each of said amplifier chips includes:

first transistor circuit means providing a very high shunt input impedance and producing an amplified replica of the input signal; and second transistor circuit means receiving said replica and producing an output signal indicative thereof at a very low output impedance.

3. A biopotential sensor comprising:

electrode plates of conductive material each formed on one side to directly contact selected surfaces of the skin of a subject for transferring biopotentials thereat, said electrode plates include two active plates and a reference plate;

integrated circuit means contiguously affixed to the other sides of said active plates and including a unitary operational amplifier circuit chip on which said active plates are positioned spatially to each other on opposite sides of said reference plate receiving said active plate biopotentials for producing output signals of the opposite phase indicative of said active plate biopotentials for transmission; and remote measuring means connected to said amplifier means and said reference plate for receiving and indicating said output signals and reference plate biopotential.

4. A biopotential sensor according to claim 3 wherein said amplifier circuit chip includes:

transistor circuit means providing a very high shunt input impedance and producing amplified replicas of the input signals; and amplifier circuit means receiving said replicas and producing an output signal indicative of the difference thereof at a very low output impedance.